(No Model.) 6 Sheets—Sheet 1.
G. ELRICK.
STRAW BINDER.
No. 470,665. Patented Mar. 15, 1892.
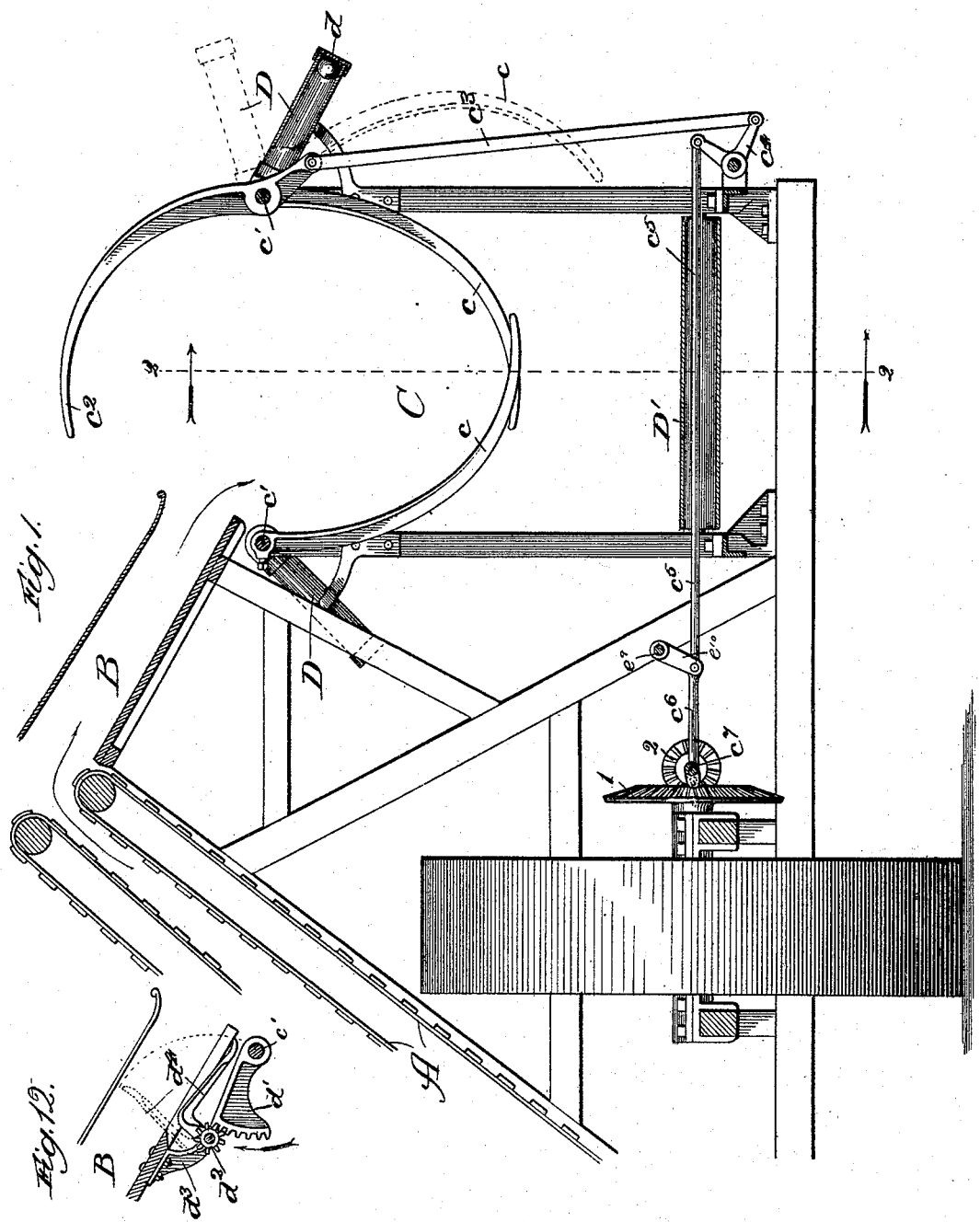
Witnesses:
Inventor:
George Elrick,
By Banning & Banning & Payson
Att'ys

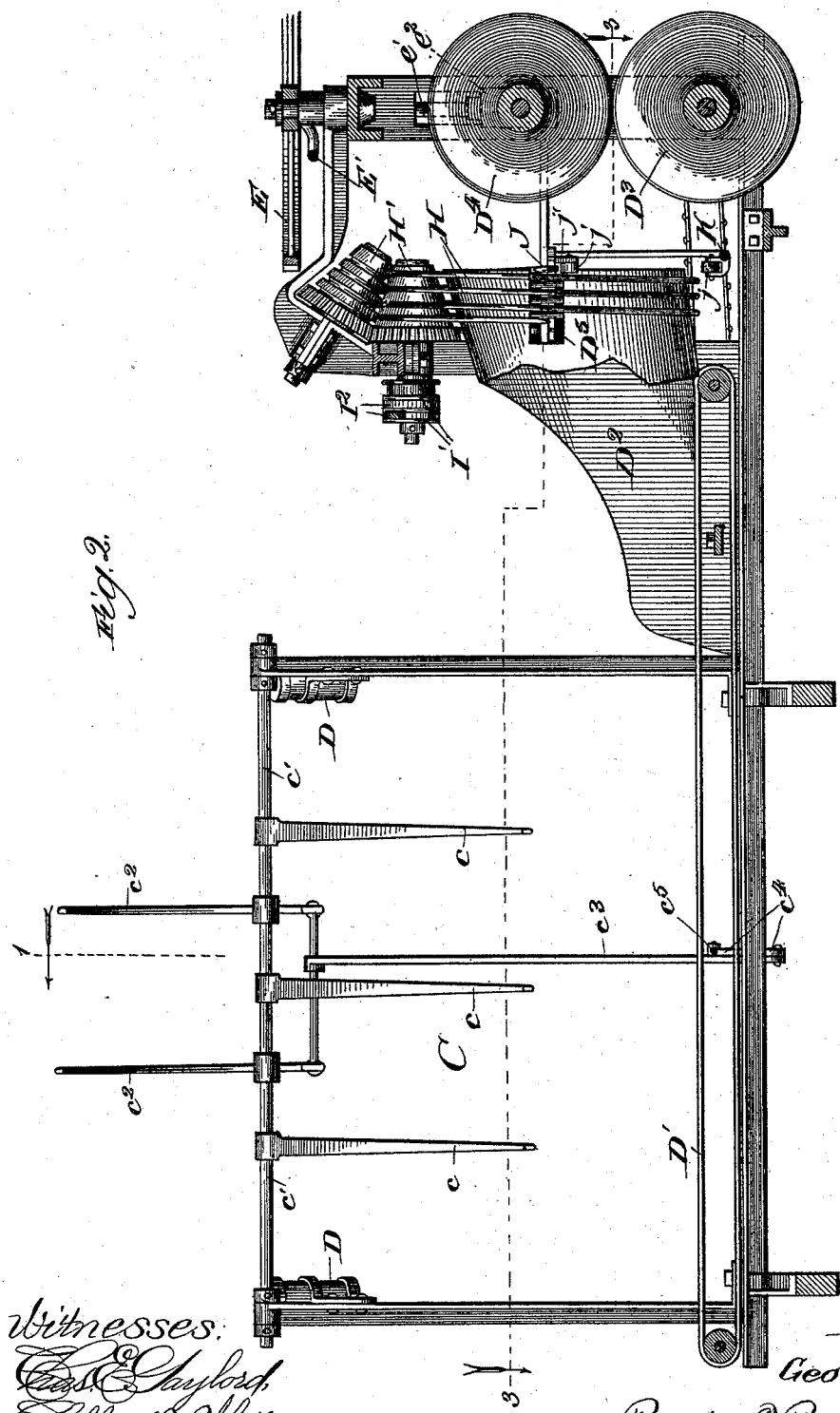

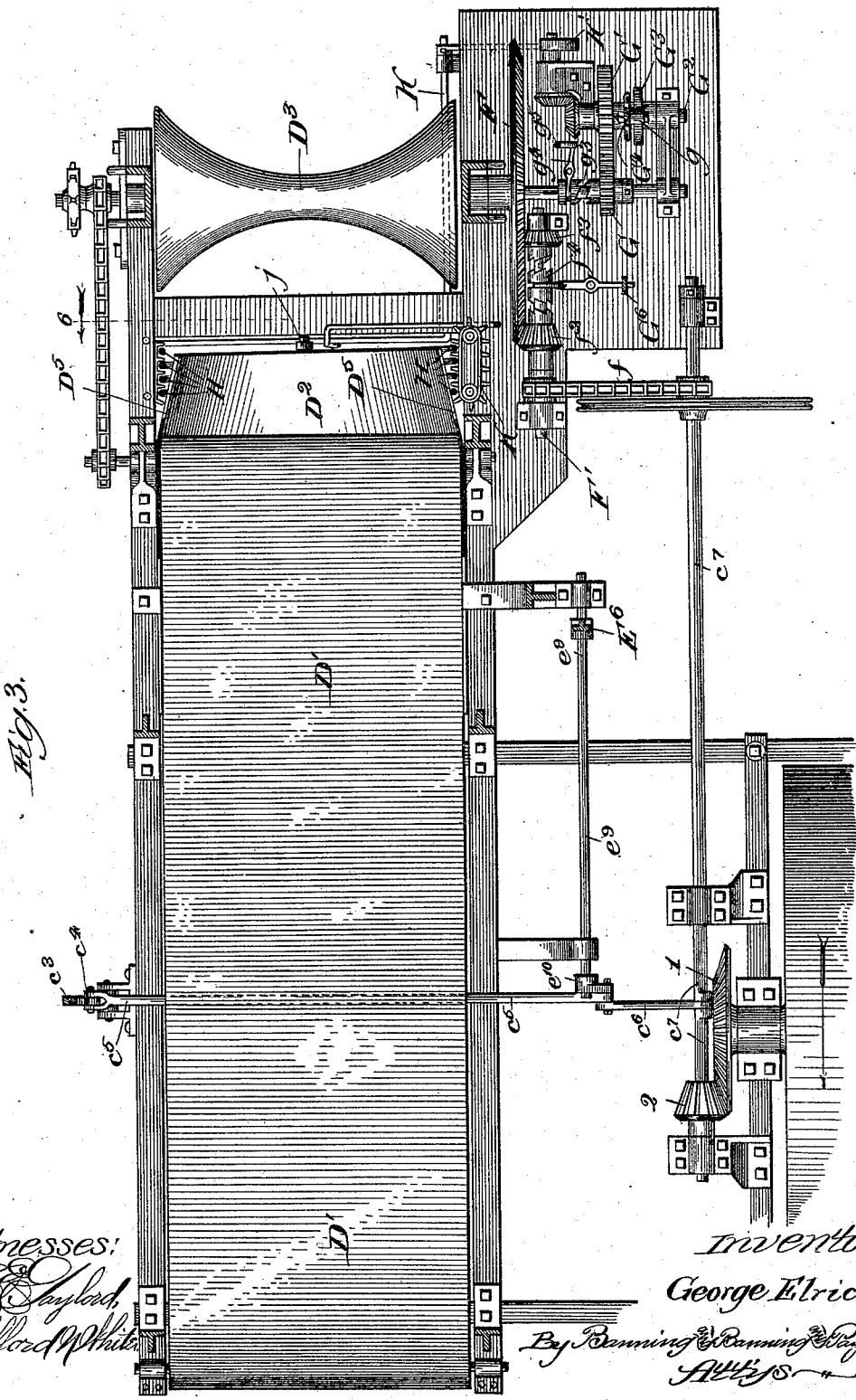

(No Model.) 6 Sheets—Sheet 4.
G. ELRICK.
STRAW BINDER.
No. 470,665. Patented Mar. 15, 1892.
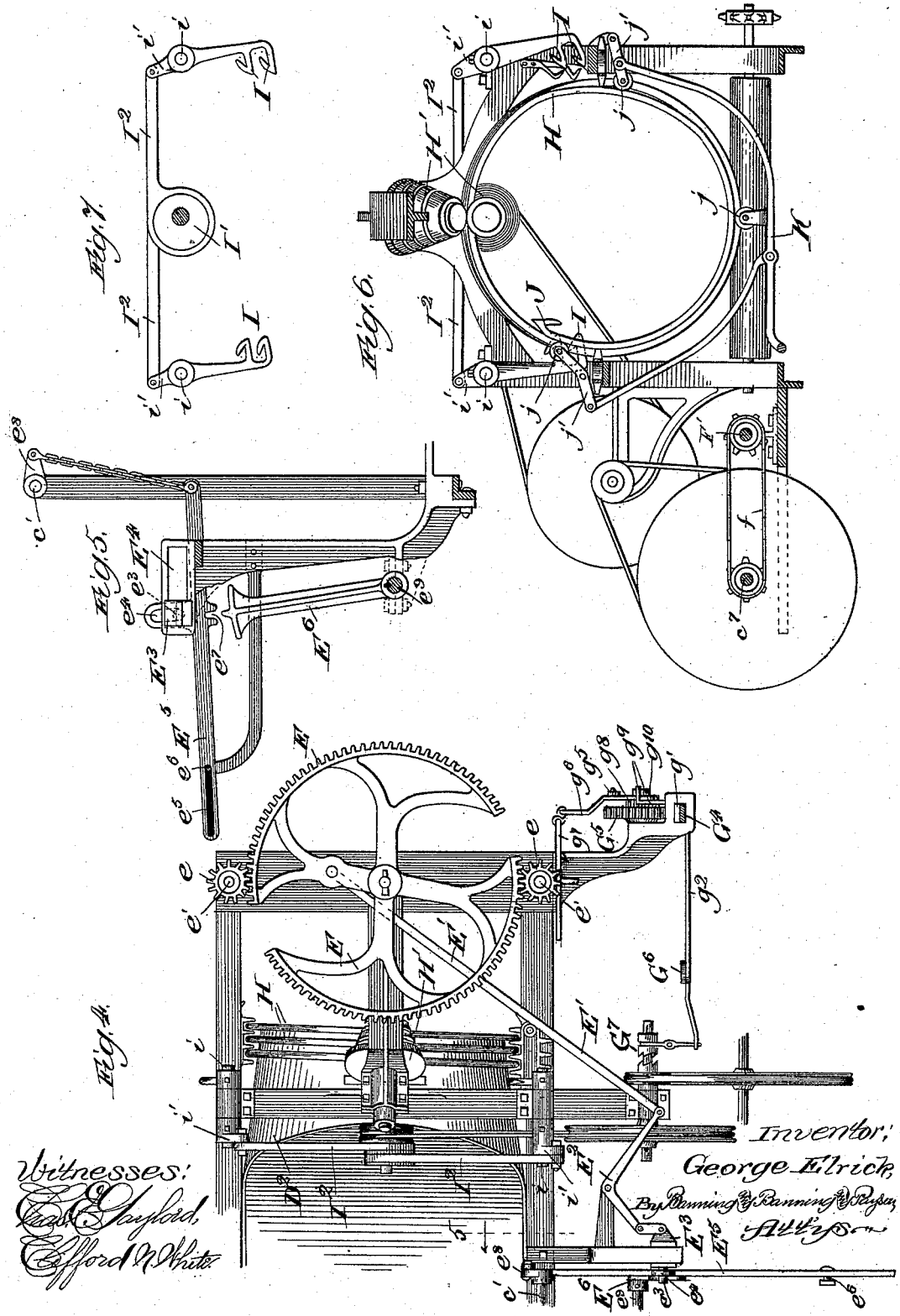
Witnesses:
Inventor:
George Elrick (No Model.) 6 Sheets—Sheet 5.
G. ELRICK.
STRAW BINDER.
No. 470,665. Patented Mar. 15, 1892.
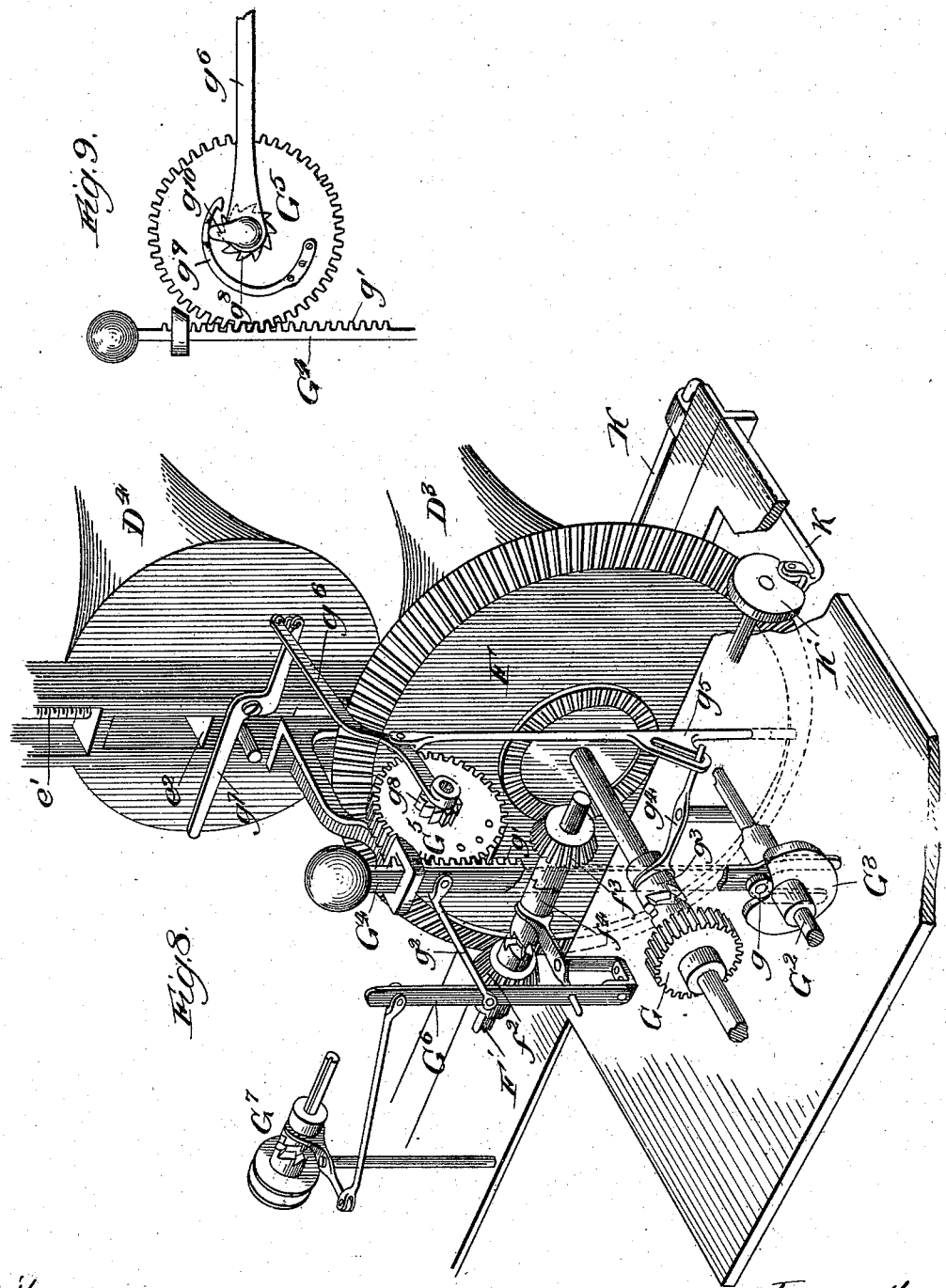
Witnesses:
Inventor:
George Elrick
By Banning & Banning & Payson
Attys (No Model.)
6 Sheets—Sheet 6.
G. ELRICK.
STRAW BINDER.
No. 470,665.
Patented Mar. 15, 1892.
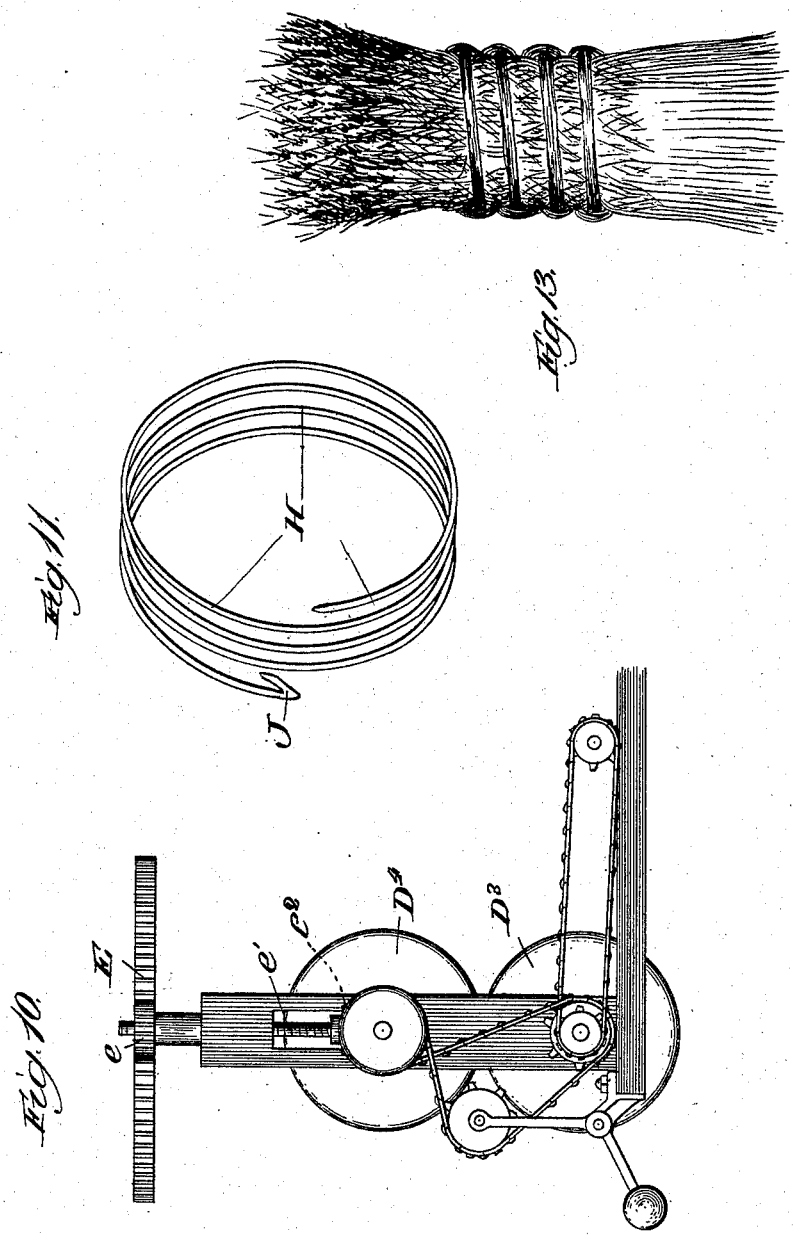
Witnesses:
Inventor,
George Elrick

UNITED STATES PATENT OFFICE.

GEORGE ELRICK, OF JOLIET, ILLINOIS.

STRAW-BINDER.

SPECIFICATION forming part of Letters Patent No. 470,665, dated March 15, 1892.

Application filed October 14, 1890. Serial No. 368,059. (No model.)

*To all whom it may concern:*

Be it known that I, GEORGE ELRICK, residing at Joliet, Will county, Illinois, have invented certain new and useful Improvements in Straw-Binders, of which the following is a specification.

In the drawings, Figure 1 is a rear sectional elevation of my improved straw-binder, taken in line 1 of Fig. 2, looking in the direction of the arrow. Fig. 2 is a side sectional elevation taken in line 2 of Fig. 1, looking in the direction of the arrow. Fig. 3 is a plan sectional view taken in line 3 of Fig. 2, looking in the direction of the arrows. Fig. 4 is a plan view of the binding devices. Fig. 5 is an end sectional elevation taken in line 5 of Fig. 4, looking in the direction of the arrow. Fig. 6 is an end sectional elevation taken in line 6 of Fig. 3, looking in the direction of the arrow. Fig. 7 is a detail of one of the parts hereinafter described. Fig. 8 is a perspective diagrammatic view of some of the operative parts of the binder. Figs. 9, 10, 11, and 12 are details which will be hereinafter described, and Fig. 13 is a view of a bound bundle.

In making my improved straw-binder I arrange the mechanism which composes it in such a way that when a bundle has been accumulated of sufficient size it is advanced to the binding mechanism proper, where wisps are drawn out of its sides, so as to form loops, as it were, and other wisps drawn through the loops, so as to weave the wisps, as it were, and bind them around the bundle to properly tie and secure it together.

My binder is intended to be attached to ordinary harvesters as used at the present time, in which the grain falls upon a traveling canvas or apron, by which it is carried across the platform and received by an elevating-canvas A. The stream of grain is carried up over the main wheel of the harvester by this elevating-canvas and passes down through a chute B into a receptacle C. This receptacle is formed by a series of arms $c$, mounted on shafts $c'$. These arms $c$ incline downwardly and toward each other, so as to form a receptacle adapted to receive the grain as it is discharged through the chute B. Loosely mounted on the outer shaft $c'$ are other arms $c^2$, which incline upward and over the top of the receptacle in which the grain is deposited. As the grain accumulates in the receptacle the arms $c^2$, loosely mounted, as above said, on the outer shaft $c'$, are given a reciprocating movement downward on the accumulating grain and back again by means of a link $c^3$, bell-crank $c^4$, and reciprocating rods $c^5$ and $c^6$, mounted on a crank on the shaft $c^7$, which is rotated by means of the beveled gears 1 and 2 shown. The downward packing movements of the arms $c^2$ serve to pack and compress the bundle as it forms in the receptacle C until it has retained the requisite size. As the bundle becomes sufficiently large and compact it presses the arms $c$, arranged under it, downward and outward. As this takes place the shafts $c'$ are gradually turned. Arranged on these shafts are cases or tubes D, in which balls $d$ are arranged so as to freely roll back and forth in the cases. While the arms $c$ are in their normal condition under the bundle to receive it the cases D are in a position in which their outer ends are lower down than their ends connected with the shafts $c'$. The balls $d$ therefore remain at the outer ends of the cases to hold the arms $c$ in place under the accumulating bundle. As the bundle increases in size and weight, however, it presses the arms $c$ back, turning the shafts $c'$ and raising the cases D, until finally their outer ends are raised to a position higher than the ends mounted on the shafts, as shown in dotted lines in Fig. 1. This causes the balls immediately to roll to the inner ends of the cases, which throws the arms $c$ entirely out from under the bundle, allowing it to drop onto a traveling canvas D'. As soon as fully released from the bundle the weight of the arms causes them immediately to swing back into position again to receive another bundle. The cases are again turned into position, with their outer ends lower than their point of attachment with the shaft $c'$, and the balls again roll out to the outer end and hold the arm $c$ steadily in position until another bundle has been accumulated, when it will be released in the same way as the first, already described. As the bundle is discharged from the receptacle C it becomes desirable to stop the flow of grain through the chute B for an instant until the arms $c$ can be swung back into position to receive the inflowing grain. Otherwise some grain would escape in a loose condition onto the canvas D', which would not be in proper position or condition to be bound.

In order to close the end of the chute momentarily, I have arranged on the inner one of the shafts $c'$ a toothed segment $d'$, that engages with a pinion $d^2$, arranged on a shaft supported in a bracket $d^3$ on the under side of the frame forming the chute B. Mounted on the shaft carrying the pinion $d^2$ is arranged an arm $d^4$, adapted to work through a slot in the bottom of the chute B. As the inner shaft $c'$ is turned by the falling of the arms $c$ to permit the bundle to escape the toothed segment $d'$ is turned with it. This also turns the pinion $d^2$ and the shaft on which the arm $d^4$ is mounted. This causes the arm $d^4$ to be thrown up, as shown in dotten lines in Fig. 12, to stop the flow of grain until the arms $c$ fall back into their receiving position. As this takes place the shaft $c'$ is turned in the opposite direction, which causes the arm $d^4$ to move back in the slot in the bottom of the chute B out of the path of the grain, which permits it to flow on through the chute and into the receptacle C. When the bundle falls on the traveling canvas D', it is immediately moved rearward head first into a chute $D^2$, preferably made of a circular form and of sheet-iron, although other material may be used to make it, if desired. This chute $D^2$ is preferably inclined, so that as the grain passes through it the heads or advancing end of the bundle are compressed into a smaller compass and the bundle held in a close and compact condition. As the bundle passes through the chute $D^2$ its advancing end or the heads pass between two rollers $D^3$ and $D^4$. These rollers are preferably made in a concave form, as shown in Figs. 3 and 8, so that while their ends are together there will be a space in their middle portion to receive the end of the bundle. It may be desirable, however, that a greater space should be provided, and to that end I have arranged to have the upper of the two rollers lifted up in the frame-work or standards in which it is supported just before the heads of the grain forming the incoming bundle reach the rollers. This allows the advancing end of the bundle with the heads of the grain to pass between the two rollers without interruption or interference. I have then provided to have the upper roller again automatically fall into position on the bundle, thus grasping it closely and securely between the two rollers, so that they will advance it by their pressure upon it. In order to secure this automatic raising and lowering of the roller at the proper time, I have arranged over the roller a large gear or double segment E, whose teeth engage with pinions $e$ on vertical screw-threaded rods $e'$, whose lower ends are connected with blocks $e^2$, in which the ends of the upper roller are mounted. As the gear or double segment E is rotated in the one direction or the other it will cause the screw-threaded rods $e'$ to run the blocks $e^2$ up or down, thus carrying the roller up or down with them.

In order to impart the rotation to the double segment E desired, a rod E' runs from it to a bell-crank lever $E^2$, which is connected by a link to a sliding block $E^3$, adapted to slide back and forth in a slot $E^4$. At the end of the sliding block is a stud $e^3$, arranged in a loop $e^4$ on the sliding or reciprocating rod $E^5$. This reciprocating rod is provided with a slot $e^5$, adapted to move back and forth on the pin $e^6$. On the under side of this sliding or reciprocating rod $E^5$ is arranged a notch $e^7$. (Shown in Fig. 5.) As this reciprocating rod $E^5$ is moved back and forth it will, by moving the block $E^3$ back and forth, operate the bell-crank lever $E^2$ and cause the rod E' to be moved back and forth. This will operate the double segment E, so as to run the vertical rods $e'$ up or down and carry the upper roller with them.

In order to impart the requisite reciprocating motion to the rod $E^5$ at the proper moment, I have arranged a crank $e^8$ on the inner of the shafts $c'$ and connected this crank by a chain to the end of the bar $E^5$, holding such end up while the bundle is accumulating in the receptacle C. I have mounted a standard $E^6$ on a shaft $e^9$, whose end terminates in a crank $e^{10}$ on the end of the reciprocating rod $c^5$. This causes the rod $e^9$ to oscillate back and forth, and with it the standard $E^6$. This standard $E^6$ is provided with a tooth at its upper end, as shown in Fig. 5, immediately under the notch $e^7$ in the reciprocating rod $E^5$. As now the arms $c$ drop from under the bundle to let it fall on the traveling canvas D' the crank $e^8$ is turned, so that the end of the reciprocating bar $E^5$ is permitted to drop, bringing its notch into engagement with the tooth on the upper end of the oscillating standard $E^6$. At the very moment, therefore, that the bundle is advanced on the canvas D' through the chute $D^2$ the reciprocating bar $E^5$ comes into engagement with the oscillating standard $E^6$ and is moved by it in that direction which, through its connection with the bell-crank lever $E^2$ and the rod E', causes the double segment E to be turned, so as to run the blocks in which the upper roller is mounted up, and thus lift it up to permit the heads of the incoming bundle to pass freely between the two rollers. Immediately, however, the reciprocating bar $E^5$ is carried by the standard again in the opposite direction. This causes the upper roller to be run down onto the heads of the grain, so as to grasp the incoming bundle and secure it between the two rollers. By this time the receiving-arms $c$ swing back into place, so that the end of the reciprocating arm $E^5$ is lifted out of engagement with the oscillating standard $E^6$, so that the rollers are left in position to draw the bundle forward.

During the binding or tying operation, which will be presently described, it is desirable that the bundle shall be advanced by the rollers slowly until the tying operation has been completed, and then rapidly advanced, so as to be discharged from the binder as soon as possible. I provide, therefore, to rotate the rollers slowly while the bundle is being tied and to rotate them rapidly immediately thereafter to secure a speedy discharge of the bundle. In order to secure this slow and then rapid rotation of the rollers, I mount a double gear-wheel F on the shaft of the lower roller. This "double gear-wheel," as the term indicates, is provided with two sets of teeth, as shown in Fig. 8. To impart rotation to this double gear F, the shaft $c^7$, which secures its rotation from the main driving-wheel of the machine, is connected by a sprocket-chain $f$ to a sprocket-wheel on a shaft F', which carries beveled gears $f^2$ and $f^3$, which are mounted loosely on it. The beveled gear $f^2$ is intended to be in engagement with the outer set of teeth and the beveled gear $f^3$ in engagement with the inner set of teeth on the double gear F. A clutch $f^4$, mounted fixedly on the shaft F', is arranged to be thrown into engagement with one or the other of these beveled gears, as may be desired. When thrown into engagement with the pinion $f^2$, such pinion is caused to rotate with the shaft F', and when thrown into engagement with the pinion $f^3$ that pinion is caused to rotate with the shaft. When, therefore, the pinion $f^2$ is held to rotate with the shaft, it will rotate the beveled gear F, and, as its engagement is with the outer set of teeth on the beveled gear, it will impart a slow speed of rotation to such gear and to the rollers which depend upon it for their rotation. It is intended, therefore, that the clutch $f^4$ shall be in engagement with the pinion $f^2$ while the bundle is being bound or tied, so that the rollers will advance it slowly, and that as soon as the operation of tying is completed the clutch shall be shifted into engagement with the pinion $f^3$, so that a rapid speed of rotation will be imparted to the rollers to quickly discharge the bundle. In order to effect this shifting of the clutch from one to the other at the proper time, I mount a gear G on the same shaft on which the beveled gear F is mounted. This gear is connected with another one G' on a counter-shaft G², carrying a cam G³. A vertical weighted bar G⁴ is mounted astride the counter-shaft G² and carries a friction-roller $g$, that rides on the cam G³. At the upper end of the bar G⁴ is arranged a series of teeth $g'$, that engage with the teeth of a gear-wheel G⁵. As the cam G³ is carried around by the rotation of the counter-shaft G² it lifts the bar G⁴, which is carried on it, by the friction-wheel $g$, so as to rotate the gear-wheel G⁵. As this bar is raised it swings or oscillates a lever G⁶ through a link connection $g^2$. This swinging bar G⁶ is connected with the clutch $f^4$, so as to move it into engagement with the pinions $f^2$ or $f^3$, as desired. As the bar G⁴ is raised the clutch $f^4$ is thrown into engagement with the beveled gear $f^2$, and as it falls it causes the clutch to be thrown into engagement with the pinion $f^3$. Owing to the shape of the cam G³ the bar G⁴ is held up during nearly the complete revolution of the cam. During all this time the clutch $f^4$ is in engagement with the beveled gear $f^2$, so as to cause the rollers to be rotated slowly. The parts are so timed in their operation that the cam G³ will hold the bar G⁴ up long enough for the binding operation on the bundle to be completed. As this is finished, however, the cam G³ is moved around far enough to permit the bar G⁴ to drop down and shift the clutch $f^4$ into engagement with the beveled gear $f^3$ and cause a rapid rotation of the rollers to discharge the bundle. It is desirable, therefore, that the gear G should be set into operation at the time the binding of the bundle commences, so that it can operate the counter-shaft G² and cam G³ to secure the movement above explained.

To set the gear G into operation, there is provided a clutch $g^3$, rotatable with the shaft on which the beveled gear F is mounted, adapted to be slid back and forth into or out of engagement with the gear G. This clutch is operated by means of a lever $g^4$, whose end is arranged in an inclined slot of a vertical rod $g^5$, pivoted to a lever $g^6$, connected by a link to a lever $g^7$, which is moved or operated by the end of the shaft on which the upper roller is mounted. As this roller is thrown up it moves the parts so that the clutch $g^3$ is thrown into engagement with the gear-wheel G and causes it to rotate with the shaft. The clutch remains in engagement with the gear G, after the roller D⁴ moves down, until the bar G⁴ falls. As before explained, this bar is provided with teeth in engagement with a gear G⁵. The bar or lever $g^6$ terminates in a ratchet $g^8$, which is loosely mounted on the shaft of the gear G⁵. A spring-dog $g^9$ is arranged in connection with this ratchet, so that it will not engage the teeth as the gear G⁵ is turned by the raising of the bar G⁴. As such bar drops back into its down position it rotates the gear G⁵ in that direction, which causes the dog to engage with the teeth of the ratchet and rotate it. This throws the end of the lever $g^6$ in its up position again and causes the clutch $g^3$ to be disengaged from the gear G and the clutch G⁷ also to be disengaged to stop the binder, as shown in Fig. 8. Thus the disengagement of the clutch $f^4$ from the pinion $f^2$ and its engagement with the pinion $f^3$ and the disengagement of the clutch $g^3$ from the gear G and of the clutch G⁷ takes place simultaneously, and the rapid rotation of the rollers immediately ensues, so as to quickly discharge the bundle. While the lever G⁶ is in its up position it is desirable to hold the dog $g^9$ out of engagement with the teeth of the ratchet $g^8$, so that as the upper roller is raised it may freely throw the end of the lever G⁶ down. I effect this by means of a cam-finger $g^{10}$, arranged on the shaft on which the gear $G^5$ is mounted, which stands up in position to hold the dog out of engagement with the teeth of the ratchet until the gear $G^5$ has been rotated by the movement of the bar $G^4$. This moves the dog past the finger enough to permit it to engage with the teeth of the ratchet.

In order to bind or tie the straw of the bundle into a band as it passes through the chute $D^2$, I have provided such chute with slots $D^5$, arranged, preferably, on opposite sides of the chute. Around the chute is arranged a twister or binder H, composed of a coiled wire or rod, which passes three or four times around the chute. The particular number of coils which is given to the binder is a matter that is not essential so long as a sufficient number are given to insure a complete and perfect binding of the bundle. One end of this binder is pointed, while the other is provided with an inwardly-projecting hook J. It is caused to pass round the outside of the chute $D^2$ by means of cone-shaped rollers H', which are provided with grooves, in which the wire of the binder is held and moved. The cone-shaped rollers H' are caused to rotate by means of belt or chain connections from the shaft $c^7$. (Shown particularly in Fig. 6.) As other means of rotating them, however, may be adopted, if desired, I shall not stop to describe these parts in detail. As the rollers H' are rotated they cause the twister H to constantly move round and round the chute $D^2$. As the bundle is passing through this chute wisps of straw are drawn out through the slots $D^5$, so as to form loops, as it were, in the straws at these points. The hooks for reaching into the bundle through the slots in the chute $D^2$ and pulling out the straw in their backward movement are mounted on an eccentric I', arranged on the shaft supporting the lower cone-shaped roller H'. As this shaft revolves and carries the eccentric around with it bars $I^2$ are moved back and forth, or "in and out," as it may be termed. The hooks I are mounted on shafts $i$, which have cranks $i'$, pivotally connected to the ends of the rods $I^2$. As the rods $I^2$ move out and in they oscillate the shafts $i$ through means of the crank $i'$, and, as the hooks I are fixedly connected to the shafts $i$, they are caused to dip into the bundle and pull a wisp out from it at every revolution of the shaft on which the eccentric I' is mounted. As the straw composing the bundle is of considerable length, the hooks merely draw out the straws at the point where they seize hold of them, so as to form, as it were, loops in the straw of the bundle. As the straw is thus drawn out it is pierced by the sharp end of the binder, which, as before explained, is passing round and round on the outside of the chute $D^2$. As the point of the binder enters the wisp it will divide it, leaving a portion on the outside. As the binder continues on its course it will in like manner pierce the wisp as it passes the slot on the opposite side of the chute. A portion of the two wisps thus first pierced will be on the outside of the first turn or convolution in the wire of the binder, while the balance of the wisps will be under the other turns or convolutions. As the binder continues on its course it will pierce the third and fourth wisps in the same way, and so on until it has pierced two wisps for every turn or convolution it is provided with. The other end of the wire composing the binder, as heretofore explained, contains an inwardly-projecting hook. As the binder passes round and round the bundle the hook will catch a wisp of straw and draw it through the various loops or wisps which have been pierced by the binder and through which its wire is passing. The hook each time it passes through a wisp and as the wisp is leaving the wire of the binder will draw another wisp, which it catches, through the one which is passing off of it. As the hook J on the end of the binder draws its own wisp through the wisp drawn out by the hooks I it will carry it on around the bundle, if the straws be long enough, and through another wisp on the opposite side. As the wisp first caught by the hook passes out from the hook other straws will be caught, so that there will constantly be a wisp of straw drawn by the hook of the binder through the wisps drawn out by the hooks I and which have been successively pierced by the sharpened point of the binder. In this way there will be a weaving, as it were, of the two sets of wisps together, the ones drawn out by the hooks I and the ones which are drawn in and around the bundle by the hook J on the end of the binder, as shown in Fig. 13.

In order to press the hook J in, so that it will be sure to catch a wisp and draw it through the loops, I have provided friction-rollers $j$, mounted on levers $j'$, operated by a rod K, under which rollers the outer side of the wire passes and which cause the hook to dip into the bundle at these points to catch a wisp and carry it through the loops. A rod K, which is provided with a crank-arm, is moved from time to time by a cam K', so as to cause the friction-rollers $j$ to move inward and press the hook J into the bundle to seize a wisp. As the object of these details is simply to insure the dipping in of the hook on the end of the twister, so as to secure its wisp from time time, other means may be employed for the same purpose, if desired. As the wire of the binder passes through the successive loops of straw drawn out by the hooks I and the hook J on its end draws other wisps through them there would be a tendency for the binder to carry the wisps along with it as it moved around the bundle. To prevent this, I have provided at each side endless chains $K^2$, arranged on suitable rollers and provided with projecting teeth, through which the convolutions of wire in the binder pass and by which loops of straw are made to slip on the wire or the coils or convolutions of the binder instead of being carried around with them. This arrangement is shown in Fig. 3.

While I have described my invention above with great minuteness and precision, yet I wish to say in closing that I do not wish to limit myself to all the specific features and details described, because the essentials of my invention, as I view them, consist in only a few main substantive features, which I will enumerate in my claims.

What I claim is—

1. In a straw-binder, a binder comprising a wire or rod formed into a number of turns or convolutions movable around the bundle as the same is bound, substantially as described.

2. In a straw-binder, a binder comprising a wire or rod formed into a number of turns or convolutions movable around the bundle as the same is bound and having the end of the wire first reached by the bundle pointed and the other end hooked, substantially as described.

3. In a straw-binder, the combination of a binder comprising a wire or rod formed into a number of turns or convolutions movable round the bundle as the same is bound and having the end of the wire first reached by the bundle pointed and the other end hooked, and hooks for drawing wisps of straw out of the sides of the bundle into the path of the pointed end of the binder that it may pierce and pass through them, substantially as described.

4. In a straw-binder, the combination of a binder comprising a wire or rod formed into a number of turns or convolutions, through which the bundle passes, and means for moving such turns or convolutions round the bundle while it is being bound, substantially as described.

5. In a straw-binder, the combination of a binder comprising a wire or rod formed into a number of turns or convolutions, through which the bundle passes, and a pair of rollers drawing the bundle forward through the binder at a slow speed while the binding is taking place and rapidly thereafter to discharge it, substantially as described.

6. In a straw-binder, the combination of a binder comprising a wire or rod formed into a number of turns or convolutions movable round the bundle and through which it passes, hooks for drawing wisps of straw out of the sides of the bundle into the path of the advancing end of the binder that it may pierce and pass through them, and means for holding the wisps from being carried along with the binder and out of their proper position, substantially as described.

7. In a straw-binder, the combination of receiving-arms into which the cut grain is deposited and accumulated and which yield under the pressure of the grain, and cases containing shifting balls, whose weight tends to hold the arms in receiving position until the pressure of the accumulating grain has moved them partially from under the bundle, when the shifting of the balls causes the arms to be entirely withdrawn to permit the bundle to fall, substantially as described.

8. In a straw-binder, the combination of a receptacle in which the cut grain is deposited and accumulated into quantities for bundles, means for advancing the grain after it is accumulated into a binder, a binder comprising a wire or rod containing a number of turns or convolutions, through which the bundle to be bound is passed, hooks arranged to draw out wisps of straw from the side of the bundle, means for rotating the binder and carrying its turns or convolutions of wire round the bundle to pierce and pass through the wisps drawn out by the hooks, a hook on the end of the binder to draw other wisps through the wisps drawn out by the hooks first mentioned, and means for discharging the bundle after it has passed through the binder, substantially as described.

9. In a straw-binder, the combination of a receptacle in which the cut grain is deposited and accumulated into quantities for bundles, means for advancing the grain after it is accumulated into a binder, a binder comprising a wire or rod containing a number of turns or convolutions, through which the bundle to be bound is passed, hooks arranged to draw out wisps of straw from the side of the bundle, means for rotating the binder and carrying its turns or convolutions of wire round the bundle to pierce and pass through the wisps drawn out by the hooks, a hook on the end of the binder to draw other wisps through the wisps drawn out by the hooks first mentioned, and rollers separating to receive the end of the bundle as it advances into the binder and then closing upon it to draw it forward during the binding operation and to dischage it when bound, substantially as described.

GEORGE ELRICK.

Witnesses:
  GEORGE S. PAYSON,
  THOMAS A. BANNING.